US007623968B2

(12) United States Patent
Griffiths et al.

(10) Patent No.: US 7,623,968 B2
(45) Date of Patent: Nov. 24, 2009

(54) DETERMINATION OF POROSITY AND FLUID SATURATION OF UNDERGROUND FORMATIONS

(75) Inventors: Roger Griffiths, Abu Dhabi (AE); Ollivier Faivre, Clamart Cedex (FR); Thomas Neville, Beijing (CN); Geoff Weller, Clamart Cedex (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 167 days.

(21) Appl. No.: 11/423,170

(22) Filed: Jun. 9, 2006

(65) Prior Publication Data

US 2007/0143021 A1  Jun. 21, 2007

(30) Foreign Application Priority Data

Dec. 16, 2005  (EP) ................... 05292622

(51) Int. Cl.
*G01V 5/04* (2006.01)
*G01V 1/40* (2006.01)
*G01V 3/18* (2006.01)
*G01V 9/00* (2006.01)

(52) U.S. Cl. .................. 702/8; 702/11; 702/13; 405/53; 405/130; 73/38

(58) Field of Classification Search .............. 702/7, 702/8, 11, 12, 13; 405/56, 130, 53; 73/38
See application file for complete search history.

(56) References Cited

U.S. PATENT DOCUMENTS

| 3,930,153 | A | | 12/1975 | Scott et al. | |
| 5,869,968 | A | * | 2/1999 | Brooks et al. | 324/338 |
| 6,032,101 | A | * | 2/2000 | Freedman et al. | 702/8 |
| 6,229,308 | B1 | * | 5/2001 | Freedman | 324/303 |
| 6,571,619 | B2 | * | 6/2003 | Herron et al. | 73/152.14 |
| 6,646,437 | B1 | * | 11/2003 | Chitale et al. | 324/303 |
| 6,686,738 | B2 | * | 2/2004 | Edwards | 324/303 |
| 6,768,106 | B2 | * | 7/2004 | Gzara et al. | 250/269.3 |
| 6,833,699 | B2 | * | 12/2004 | Galford et al. | 324/303 |
| 6,844,729 | B2 | * | 1/2005 | Herron et al. | 324/303 |
| 6,936,812 | B2 | * | 8/2005 | Odom et al. | 250/269.5 |

(Continued)

OTHER PUBLICATIONS

Katz, S.A. et al., "Estimation of Reservoir Porosity and Saturations Using Multiple Sources of Geophysical Data," Journal of Petroleum Engineering 13 (1995) 103-111.

(Continued)

*Primary Examiner*—Edward Raymond
*Assistant Examiner*—Elias Desta
(74) *Attorney, Agent, or Firm*—Darla Fonseca; Jaime Castano; Dale Gaudier

(57) ABSTRACT

A method of determining the porosity and fluid saturation for a given volume of an underground formation through which a borehole is drilled, the method comprising: measuring, from within the borehole, parameters relating to characteristics of the underground formation; determining volumetric values for resistivity, hydrogen index, density and neutron capture cross-section for the given volume from the measured parameters, each volumetric value including a contribution from formation matrix, water, oil and gas; determining, from the volumetric values, the volumes of rock matrix, pore water, oil and gas, and the salinity of the pore water; and determining the porosity and fluid saturation of the volume of the formation from the determined volumes and salinity.

10 Claims, 2 Drawing Sheets

U.S. PATENT DOCUMENTS

| | | | |
|---|---|---|---|
| 6,954,066 B2 * | 10/2005 | Siess et al. | 324/303 |
| 7,168,310 B2 * | 1/2007 | Al-Ruwaili | 73/152.18 |
| 7,193,414 B2 * | 3/2007 | Kruspe et al. | 324/303 |
| 7,282,704 B2 * | 10/2007 | Guo | 250/266 |
| 2003/0205082 A1 * | 11/2003 | Herron et al. | 73/152.14 |
| 2004/0222368 A1 | 11/2004 | Odom et al. | |
| 2007/0143021 A1 * | 6/2007 | Griffiths et al. | 702/6 |

OTHER PUBLICATIONS

Woznicka, U. et al., "Evaluation of Uncertainty of the Comprehensive Interpretation of Borehole Logs by the Multiple Re-Run Statistical Method," Applied Radiation and Isotopes 62 (2005) 817-827.

* cited by examiner

DETERMINATION OF POROSITY AND FLUID SATURATION OF UNDERGROUND FORMATIONS

TECHNICAL FIELD

This invention relates to techniques for determining porosity and fluid saturation of underground formations through which a borehole is drilled.

BACKGROUND ART

It is well known to investigate the properties of underground formations surrounding a borehole by making various physical measurements of the formation from within the borehole. Such measurements are particularly useful when drilling wells such as oil and gas wells for identifying formations containing fluids of interest (oil and gas). In one technique, one or more measurement tools (typically known as 'sondes') are suspended on a cable and pulled along the borehole by the cable while making measurements. This is known as wireline logging. More recently, measurement tools have been built into the drilling tools used to drill the borehole in the first place. In this way, measurements can be made during the drilling process, known as 'logging while drilling'.

Traditionally, formation properties such as porosity and fluid saturation are estimated from borehole geophysical measurements through the solution of a series of response equations relating different measurements to these formation properties. In the most common approach, these response equations are solved sequentially. For example, a density measurement is used to estimate porosity and then, based on this porosity, a resistivity measurement is used to compute water and hydrocarbon saturations. However, in order to accurately compute porosity from a density measurement, it is necessary to know the fluid density. In the presence of hydrocarbons, this fluid density is a composite of the pore filling water and hydrocarbon densities based on their respective saturations. Therefore, in order to compute an accurate porosity, it is required that the fluid saturations are known. Iterative approaches have been employed to solve this dependent problem. Another approach that has been employed is to solve these response equations simultaneously. Although this approach does allow for more accurate computation of porosity and fluid saturations, it still necessitates an understanding of the properties of the individual formation components; in the example above these include the density of the water and the hydrocarbon, and the resistivity of the water.

Formation saturation evaluation by resistivity and/or non-resistivity based methods such as formation capture cross section have been in use for a number of years and are well documented in the literature.

Recent developments in the design of logging while drilling tools mean that it is now possible to make simultaneous measurements of various formation properties at substantially the same location in the well before fluid invasion from the borehole into the formation begins to affect these properties. One such tool is described in WELLER, Geoff, et al. A New Integrated LWD Platform Brings Next-Generation Formation Evaluation Services. *SPWLA 46th Annual Logging Symposium, New Orleans, USA.* 26-29 Jun. 2005, p. 1-15. The use of this tool to provide resistivity and formation capture (sigma) measurements to be made and used in combination to compute both formation water resistivity and formation water saturation.

It is an object of this invention to provide techniques using simultaneous, multiple measurements in an appropriate fashion to solve for various formation properties without the requirement for additional a priori information normally required.

DISCLOSURE OF THE INVENTION

One aspect of this invention provides a method of determining the porosity and fluid saturation for a given volume of an underground formation through which a borehole is drilled, the method comprising: obtaining measurements, from within the borehole, of parameters relating to characteristics of the underground formation; determining volumetric values for resistivity, hydrogen index, density and neutron capture cross-section for the given volume from the measured parameters, each volumetric value including a contribution from formation matrix, water, oil and gas; determining, from the volumetric values, the volumes of rock matrix, pore water, oil and gas, and the salinity of the pore water; and determining the porosity and fluid saturation of the volume of the formation from the determined volumes and salinity.

It is preferred to also measure temperature and pressure in the borehole amongst other measurements.

The method preferably comprises determining response equations for each of the volumetric measurements and simultaneously solving these response equations.

The response equations provide a value for the parameter in question in terms of the contribution of each component of the formation: contributions relating to rock matrix can be determined from neutron capture spectroscopy measurements; contributions relating to pore water can be expressed as functions of water salinity, temperature, and pressure; contributions relating to oil can typically be considered relatively constant over a wide range of conditions so that average values can be used for these parameters with relatively little loss in accuracy; and contributions relating to gas can be computed as a function of temperature and pressure, typically based on an assumption that the gas is methane.

The step of solving the response equations preferably also includes simultaneously solving the unity equation:

$$1 = V_{ma} + V_w + V_o + V_g$$

wherein $V_{ma}$=volume fraction of rock matrix; $V_w$=volume fraction of pore water; $V_o$=volume fraction of oil; and $V_g$=volume fraction of gas.

The method can comprise using more that the four measurements indicated above, a response equation being solved for each measurement.

A priori knowledge can also be used in addition to or as an alternative to one or more of the measured volumetric values.

It is particularly preferred that the determination of fluid saturation is derived by using a cross-plot of fluid saturations determined from resistivity measurements and fluid saturations determined from neutron capture measurements.

The method according to the invention is particularly applicable to logging while drilling applications. However, it can also be applied to other techniques such as wireline drilling.

MODES(S) FOR CARRYING OUT THE INVENTION

Figure 1:
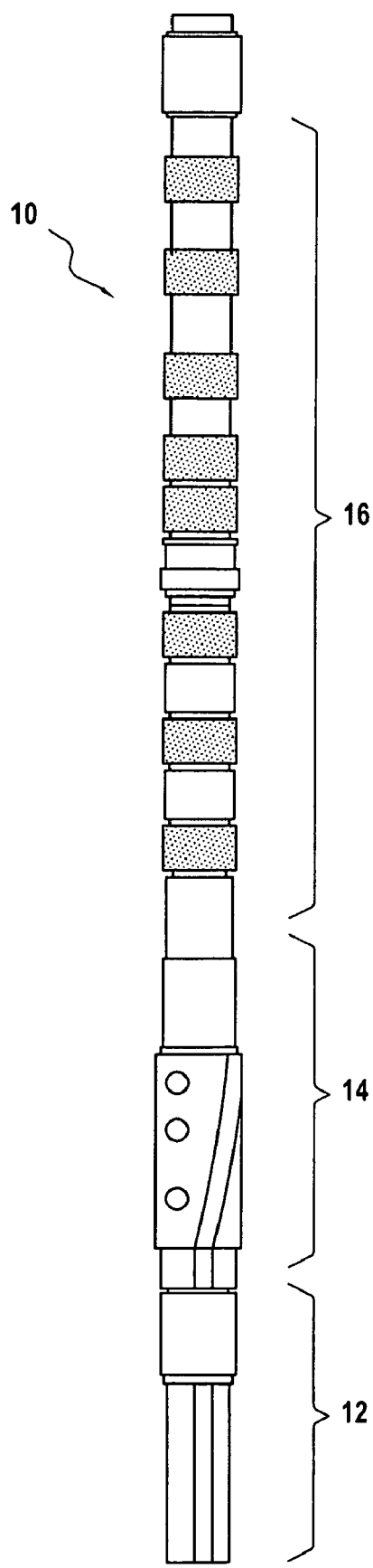
FIG. 1 shows a logging while drilling tool that can be used in this invention.

While applicable to various logging techniques, this invention is particularly applicable to a logging while drilling tool of the type shown in FIG. 1 which is described in more detail in WELLER, Geoff, et al. A New Integrated LWD Platform Brings Next-Generation Formation Evaluation Services. *SPWLA 46th Annual Loggin Symposium, New Orleans, USA.* 26-29 Jun. 2005, p. 1-15. Compared to more conventional logging while drilling tools, the tool of FIG. 1 differs in that a chemical source for density measurements (typically an AmBe source) has been replaced by an electronic pulsed neutron generator (PNG). Although the tool itself is a single collar 10, it can be considered to consist of three distinct sections, an azimuthal formation natural gamma ray measurement section 12, a stabilized gamma-gamma density measurement section 14, and a resistivity array 16.

The azimuthal formation natural gamma-ray measurement section 12 is located at the bottom of the tool to ensure that it is not influenced by the presence of the cesium-137 source of the gamma-gamma density measurement section and the PNG. Locating the natural gamma-ray here also brings the benefit of an azimuthal formation evaluation measurement very close to the bit. The optimized design and is focused to provide a high azimuthal sensitivity allowing 16-sector gamma-ray images to be generated. An annular pressure sensor and an inclinometer are also located at the lower end of the tool in this section.

The stabilized gamma-gamma density measurement section 14 is located above the azimuthal natural gamma ray section 12 and below the resistivity array 16. This section includes a stabilizer with gamma-gamma density measurement system including side-loaded cesium-137 logging source. The position of the side-loaded source can be optimized for increased count rates and enhanced density response. Two diametrically opposed ultrasonic standoff sensors provide a high-resolution caliper measurement at 16 different azimuths.

At the top of the tool is the resistivity antenna array section 16 that also includes the PNG with all the sensors required for the various related nuclear measurements. These include the near and far neutron detectors for the count rate ratio-based neutron porosity measurement. Between the near and the far neutron detectors is a gamma-ray detector, which is used for gamma-ray spectroscopy, the sigma measurement, and the neutron gamma density measurement. A second gamma-ray detector beyond the far neutron detectors provides the primary input for the neutron gamma density. Unlike a chemical neutron source, the output of the PNG can vary with time and temperature. Therefore it is necessary to constantly monitor the output and if necessary adjust it through a control loop. This is accomplished by a special detector that monitors the fast, unscattered neutron flux of the PNG. This special detector is placed close to the target of the PNG and is not affected by the formation. The PNG and the nuclear detectors are located underneath the propagation resistivity antenna array. This has the advantage of closely co-locating the various resistivity measurements with the measurements derived from the PNG and its associated detectors.

Co-location of the PNG and resistivity antennas means that all measurements are delivered relatively close to the bottom of the tool.

Measurements that can be derived from a pulsed neutron source include hydrogen index, formation capture cross section (sigma), formation density from neutron-induced gamma-rays, and formation elemental composition from the capture spectra (capture spectroscopy). The latter can be used to derive lithology and formation grain characteristics. U.S. Pat. No. 6,648,083 B (SCHLUMBERGER TECHNOLOGY CORPORATION) 18.11.2003, and U.S. Pat. No. 6,703,606 B (SCHLUMBERGER TECHNOLOGY CORPORATION) 09.03.2004 describe in more detail how such a tool can be operated to make such measurements.

This invention allows computation of porosity and fluid saturations independently of a knowledge of matrix and fluid properties by combining neutron capture spectroscopy, resistivity, density, hydrogen index, and other measurements such as capture cross section. As this computation does not require an a priori knowledge of matrix and fluid properties, it is well suited to application in an automatic fashion and in a real time operating mode. This computation is based on a fundamental assumption that all measurements are seeing the same matrix and fluid volumes, therefore it is particularly applicable to use with LWD data where the formation is investigated prior to the onset of significant invasion. It also relies on a reasonable knowledge of downhole temperature and pressure; these are routinely available from MWD/LWD tool strings. Measurements from the tool of FIG. 1 are considered as particularly applicable to this method as they are all made close together and close to the bit so as to satisfy the conditions that they are made on the same volumes and before invasion.

The preferred embodiment of the invention is based on the simultaneous solution of at least five equations relating logging measurements to volumes of formation components and their properties, and the unity equation, for example the simultaneous solution of resistivity $\sigma_t$, density $\rho$, hydrogen index HI, and capture cross section $\Sigma$ response equations:

$$\rho_b = V_{ma} \cdot \rho_{ma} + V_w \cdot \rho_w + V_o \cdot \rho_o + V_g \cdot \rho_g$$

$$HI = V_{ma} \cdot HI_{ma} + V_w \cdot HI_w + V_o \cdot HI_o + V_g \cdot HI_g$$

$$\Sigma = V_{ma} \cdot \Sigma_{ma} + V_w \cdot \Sigma_w + V_o \cdot \Sigma_o + V_g \cdot \Sigma_g$$

$$\sigma_t = \left(\frac{V_w}{V_w + V_o + V_g}\right)^n \cdot \frac{(V_w + V_o + V_g)^m}{a} \cdot \sigma_w$$

$$1 = V_{ma} + V_w + V_o + V_g$$

The Archie equation is given above as a specific example of a resistivity response equation. However, the method can be easily extended to use any resistivity response equation.

For each response equation, there are response parameters relating to the rock matrix ma, pore filling water w, oil o, and gas g. Relevant parameters for the rock matrix can be obtained from neutron capture spectroscopy measurements as is described in HERRON, Susan, et al. Application of Nuclear Spectroscopy Logs to the Derivation of Formation Matrix Density. *SPWLA 41st Annual Logging Symposium.* Jun. 4-7, 2000, no. J. p. 1-12. Response parameters for pore filling water can all be expressed as functions of the water salinity, temperature, and pressure.

Response parameters for oil are relatively constant over a wide range of conditions and so, in the absence of measured values, average values can be used for these parameters with little loss in accuracy. Response parameters for gas can be computed as a function of temperature and pressure, based on an assumption that the gas type is methane.

Therefore, using this example system of five equations, based on the four measurements detailed above, it is possible to solve for the volumes of rock matrix, pore filling water, oil, and gas, and the salinity of the pore filling water. From the individual volumes of the formation components it is then a trivial matter to compute porosity and fluid saturations.

Where more than four measurements are available, this technique can be extended to allow for direct computation of oil and gas properties through the use of appropriate algorithms, rather than relying on the assumptions described above. Alternatively, utilizing more measurements to solve for the same set of unknowns as described above improves the robustness of the computed results.

Where less than these four measurements are available, or where a priori knowledge is available about some of the desired outputs, this problem can be simplified. A simplified description of the formation can also be used with a rich data set such as that described above, again improving the robustness of the computed results.

As an example of this process, a simplified approach is described below where porosity is known from other sources, and one hydrocarbon phase (oil) is present. In this case, fluid saturations and water salinity may be solved for directly using only a resistivity and a capture cross section measurement.

For example, a 20 p.u. formation is analysed for the case where the hydrocarbons are displaced either by a 90 kppm salinity water (in the case where connate water of 90 kppm salinity sweeps the formation during production) or by a 23 kppm salinity water (in the case where injection water of 23 kppm salinity sweeps the formation during production).

Figure 2:
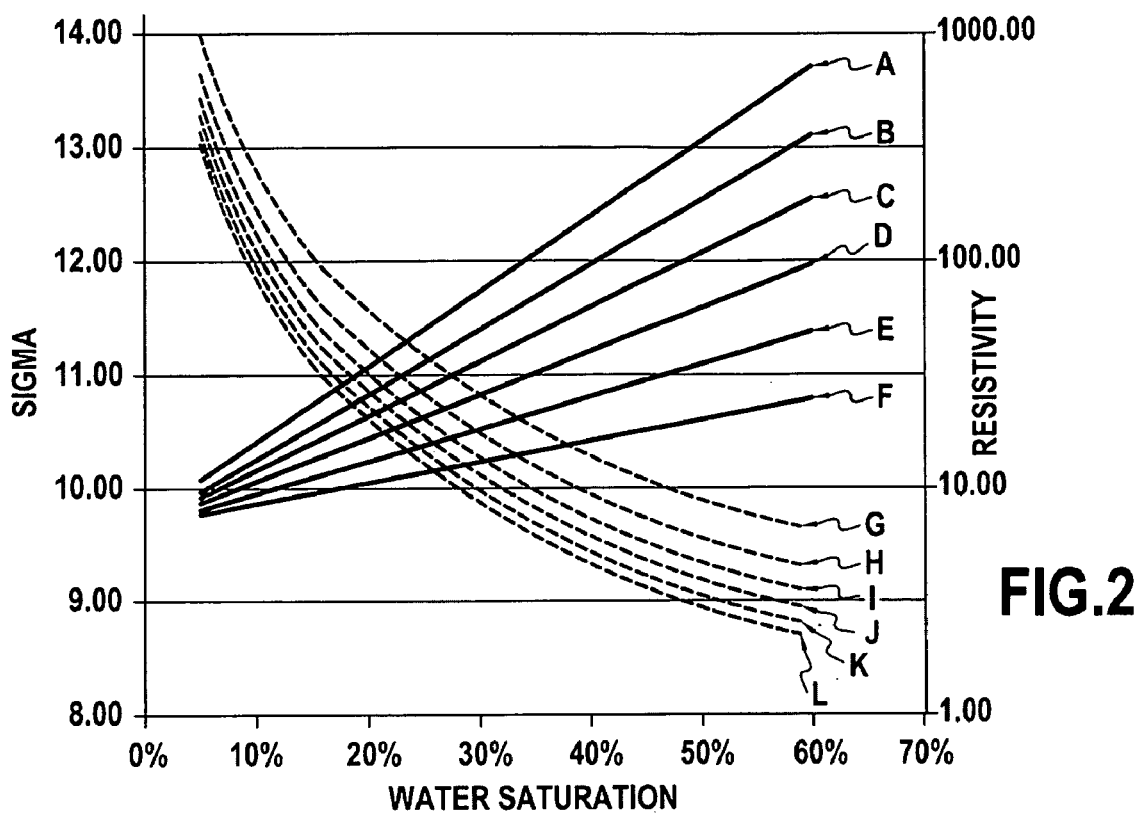
FIG. 2 shows the anticipated formation capture cross section and resistivity responses as oil is displaced by connate water (90 kppm), injection water (23 kppm) or a mixture of both.

FIG. 2 shows the anticipated formation capture cross section and resistivity responses as oil is displaced by connate water (90 kppm), injection water (23 kppm) or a mixture of both. Lines A-E show capture cross sections (sigma) and lines G-L show resistivity at 100% (90 kppm), 80% (77 kppm), 60% (63 kppm), 40% (50 kppm), 20% (36 kppm) and 0% (23 kppm) connate water respectively. For a given resistivity (e.g. 10 ohm-m), the calculated formation water saturation depends on the mixture of the injection and connate waters, in this case indicating that the calculated saturation could be anywhere between 29% and 48% depending on the water salinity assumed. Likewise for a given capture cross section value, the computed formation water saturation depends on the assumed salinity of the water in the formation. For a formation capture cross section of 10 c.u. FIG. 2 shows that in this particular case the water saturation can be anywhere from 5% to 18%, depending on the assumed water salinity. It is clear that neither individual measurement yields sufficient information to solve for both the water salinity and saturation.

However, utilising both measurements together it is possible to resolve this ambiguity by solving simultaneously for both fluid saturations and water salinity. One graphic method for achieving this is to cross plot the capture cross section-derived saturation based on an assumed formation water salinity against the resistivity-derived saturation (in this example using the Archie equation) based on a water resistivity that matches the same salinity.

Figure 3:
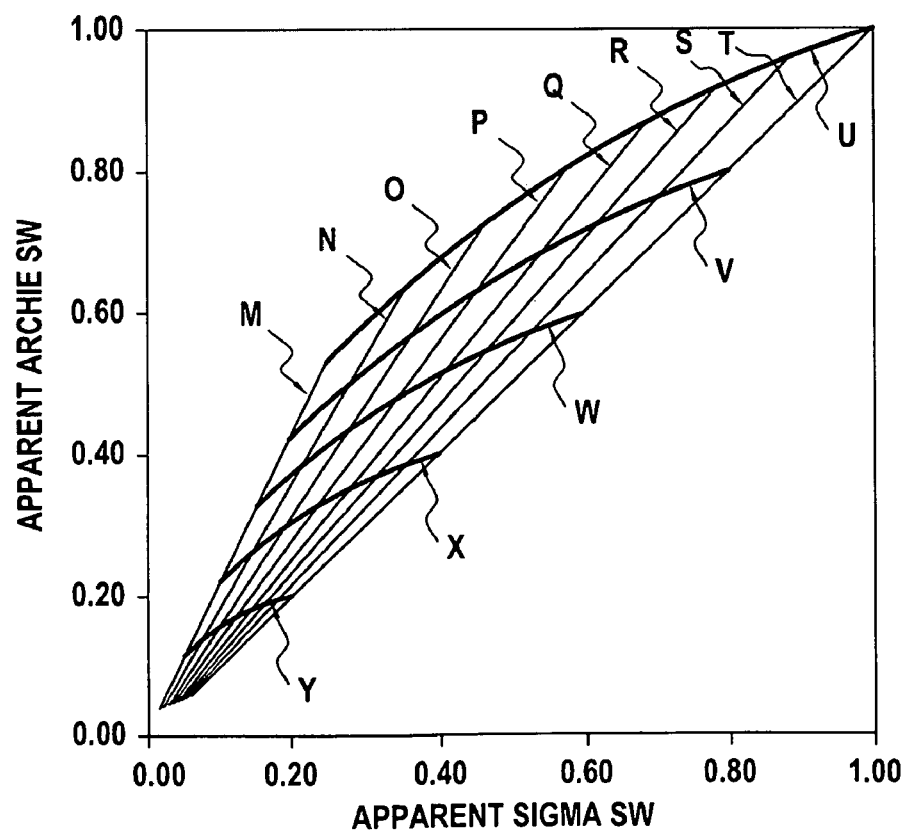
FIG. 3 shows a cross plot of iso-salinity lines and iso-saturation lines plotted against the saturation derived from capture cross section on the and resistivity.

FIG. 3 shows a cross plot of iso-salinity lines M-T (20, 30, 40, 50, 60, 70, 80, 90 kppm respectively) and iso-saturation lines U-Y (100%, 80%, 60%, 40% respectively) plotted against the saturation Sw derived from capture cross section on the x-axis (Apparent Sigma Sw) and resistivity on the y-axis (Apparent Archie Sw) for the case of a 20 p.u. clean limestone with 40% irreducible oil and an assumed formation water salinity of 90 kppm.

As can be seen from FIG. 3, if the actual formation water salinity is 90 kppm then both the resistivity and capture cross section derived saturations match. However, if there is a mixing of the injection water with the connate water then the capture cross section based Sw decreases faster than the resistivity based Sw. The spread of points can then be used to triangulate on a solution that respects both the capture cross section and resistivity responses, an example of which is shown in FIG. 3:

Sigma=11 cu=20% Sw for 90 kppm (x-axis)

Resistivity=10 ohm-m=28% Sw for 90 kppm (0.03 $\Omega$m@230° F.) (y-axis).

Cross plotting these two values of the apparent capture cross section and resistivity-derived water saturations are used to solve simultaneously for the in-situ water salinity and saturation (see intersection of vertical and horizontal lines on FIG. 2).

In this case an in-situ water salinity of approximately 50 kppm is shown at a water saturation of approximately 35%. This suggests that the water in this example is a mixture of approximately 40% of the original formation water and 60% of injection water.

This example shows how the salinity and saturation can be derived from the measurements and parameters derived for a given formation volume. Likewise, the porosity can be derived using HI and density measurements made at the same time. The manner in which this can be done is described in U.S. Pat. No. 5,608,215 B (SCHLUMBERGER TECHNOLOGY CORP) 04.03.1997 and GB 2405696 A (SCHLUMBERGER HOLDINGS LIMITED) 09.03.2005. By simultaneously solving for at least the four parameters discussed, an improved evaluation of the formation can be achieved.

By simultaneously solving for these parameters, it is possible to obtain comparable information from a given rock volume without the need to account for changes taking place in the formation that affect the different measurements in differing ways. Thus, with suitable downhole and surface processing, it is possible to deliver this information in effective real time for use by the driller during drilling of the well It will be appreciated that changes can be made while staying within the scope of this invention. For example, measurements can be made at different times provided that changes in the formation are properly accounted for to make the measurements comparable. Also, multiple measurement or measurements of further properties can be used to improve the determination.

The invention claimed is:

1. A method of determining the porosity and fluid saturation for a given volume of an underground formation through which a borehole is drilled, the method comprising:
    obtaining measurements, from within the borehole, of parameters relating to characteristics of the underground formation;
    determining volumetric values for resistivity, hydrogen index, density and neutron capture cross-section for the given volume from the measured parameters, each volumetric value including a contribution from formation matrix, water, oil and gas;
    determining, from the volumetric values, the volumes of rock matrix, pore water, oil and gas, and the salinity of the pore water; and determining response equations for each of the measurements and simultaneously solving the response equations for determining the porosity and fluid saturation of the volume of the formation from the determined volumes and salinity.

2. The method of claim 1, comprising measuring temperature and pressure in the borehole amongst the measured parameters.

3. The method of claim 1, comprising determining contributions relating to rock matrix from neutron capture spectroscopy measurements.

4. The method of claim 1, comprising determining contributions relating to pore water from the determined water salinity, temperature, and pressure.

5. The method of claim 1, comprising assigning a constant value to contributions relating to oil.

6. The method of claim 1, comprising computing contributions relating to gas as a function of temperature and pressure.

7. The method of claim 1, wherein the step of solving the response equations includes simultaneously solving the unity equation:

$$1 = V_{ma} + V_w + V_o + V_g$$

wherein $V_{ma}$=volume fraction of rock matrix; $V_w$=volume fraction of pore water; $V_o$=volume fraction of oil; and $V_g$=volume fraction of gas.

8. The method of claim 1, comprising using further measurements and solving a response equation being solved for each measurement.

9. The method of claim 1, comprising using a priori knowledge in addition to or as an alternative to one or more of the determined volumetric values.

10. The method of claim 1, comprising determining fluid saturation by using a cross-plot of fluid saturations determined from resistivity measurements and fluid saturations determined from neutron capture measurements.

* * * * *